Patented Sept. 27, 1932

1,879,601

UNITED STATES PATENT OFFICE

WALLACE L. CHANDLER, OF EAST LANSING, MICHIGAN, ASSIGNOR, BY MESNE ASSIGNMENTS, TO MERCK & CO. INC., OF RAHWAY, NEW JERSEY, A CORPORATION OF NEW JERSEY

IODINE COMPOSITION

No Drawing. Application filed March 13, 1926. Serial No. 94,618.

This invention relates to an improved iodine composition. It is particularly the main purpose of this invention and a principal object to produce an iodine material which may be safely administered to animals and which will liberate free iodine in the vicinity of nematode parasites of the gastro-intestinal tract, after administration by mouth, in sufficient amounts to kill these parasites before the free iodine is converted into inactive compounds by the action of the mucous and ingesta in the digestive tract. While the main object and purpose is as above stated, the material can be very readily used externally where iodine application is indicated.

It is a fact easily demonstrated by intravitam tests that small amounts of free iodine will kill nematodes when brought into direct contact. However, when iodine solutions, even ones containing an appreciable amount of free iodine, are administered to animals, the free iodine is very quickly, as above indicated, converted into inactive compounds; too quickly to be effective as a vermicide. Possibly the only exception as to such solutions is in the case of castor oil solutions containing an appreciable amount of free iodine. Castor oil solutions of iodine are, however, difficult and treacherous to administer to animals. Moreover, when iodogenic compounds such as a mixture of solutions of iodides and iodates are administered to animals, and the dose either accompanied by or followed by weak acids, the liberated iodine, being in solution, is destroyed (converted into inactive compounds by the mucous and ingesta) quite as readily as if it were administered in solution.

I accomplish this purpose by the process of causing free iodine to be adsorbed by various protein colloids and adsorbent powders in sufficient amounts that the iodine is readily and copiously liberated when mixed with the contents of the digestive tracts of animals. Of such protein colloids, those prepared from milk appear to be most satisfactory although egg-albumin, blood-albumin, and the like are also serviceable; and of the powders, charcoal, especially activated charcoal, appears to be best suited for the purpose.

The details of the process are as follows:

To "semi-solid buttermilk" (a product prepared by The Consolidated Products of Chicago, and being derived from milk and consisting of milk proteins) is added iodine in the form of the colloidal suspensoid described in my co-pending application for patent filed November 21, 1925, Serial No. 70,697, or a rapidly precipitated crystalline iodine such as that described in my United States Patent No. 1,535,540, issued April 28, 1925, and having an iodine content equal to the dried weight of the protein material of the "semi-solid buttermilk". This mixture is then stirred and then allowed to stand until the particles of the protein material, weighted by the adsorbed iodine, settle. The supernatant fluid is then drawn off, as a by-product which has a valuable iodine content, and the precipitated material, which is of the nature of dark brown paste, is then ready to be suspended in water for administration to animals.

The object of the invention described in the above mentioned co-pending application, Serial No. 70,697 is to produce a form or state of pure free iodine which is more active and more readily available for use as a disinfectant and for medical and surgical purposes than any of the known iodine preparations containing free, uncombined, iodine.

It is the object of that invention to produce a permanent colloidal state of iodine which, by virtue of the size and properties of the very small colloidal-like particles, remains in suspension in water, whatever the strength of the suspension, for a practical length of time to render it very highly useful in surgery and medicine and as a disinfectant.

The results of that invention are obtained by a modification and development of the process described in my United States Patent No. 1,535,450 for the production of crystalline iodine, namely to proceed under conditions of reduced temperature and in the presence of a protective colloid.

To produce the iodine suspensoid described in the said co-pending application, commercial crystalline iodine is treated in a glass or earthenware container with a dilute solution of the hydroxide of an alkali, or alkaline earth, metal until all of the iodine is used up and a straw-colored liquid results. (The strength of the hydroxide depends on the nature of the hydroxide used. In the case of sodium hydroxide a one per cent. solution appears to be best.) This liquid appears to be a dilute solution of the metal iodohypoiodite or a mixture of the metal iodide and the metal hypoiodite. Chemical tests indicate the presence of the hypoiodite. The probable reactions are indicated by the following equations:

$$I_2 + 2Na(OH) \rightarrow Na_2I(OI) \text{ or } NaI + Na(OI).$$

This straw-colored liquid is then immediately cooled to approximately 0° C. (by stirring broken ice or snow into the liquid or employing other means of cooling). A small amount of a collodial carbohydrate, for instance gum arabic, or other suitable protective colloid is then added to the liquid. This may vary from 10 grams up to an excess of the colloid. The whole is then quickly acidified with a sufficient amount of hydrochloric acid or other strong acid to precipitate all of the iodine, the mixture being agitated during acidification. This process results in the production of a brick-red precipitate, or colloidal iodine, which is permanent. The probable reactions taking place are indicated by the following equations:

$$NaI + HCl \rightarrow HI + 1NaCl$$
$$Na(OI) + HCl \rightarrow H(OI) + NaCl$$
$$HI + H(OI) \rightarrow I_2 + H_2O$$

Any coarse crystalline idoine formed during this process for the production of the described idoine suspensoid may be separated from the colloid by passing the colloidal iodine through a paper filter. The sodium chloride formed during the process may be separated from the colloidal iodine by filtering through a Chamberland filter or by allowing the container (a tall one) to stand undisturbed for several days until the colloidal iodine is somewhat concentrated in the lower part of the contained (the size of the particles, which is determined largely by the temperature at which the process is carried out, determines the rate of settling), and then siphoning off the sodium chloride solution. The small amount of iodine held in solution and in suspension by the sodium chloride may be recovered by the usual processes of iodine recovery. The colloidal-like iodine, from which the sodium chloride has been siphoned, may be diluted with water to any desired strength of the suspension being determined by direct titration with sodium thiosulphate.

Some permanent colloidal iodine, together with small ellipsoidal crystals, may be formed as the result of acidifying a mixture of solutions of iodides and iodates under conditions of reduced temperatures, and in the presence of a protective colloid, as gum arabic, or by employing a part of these modifications. For example: If a mixture of dilute solutions of sodium iodide (five parts) are sodium iodate (one part) is treated with gum arabic and then acidified with hydrochloric acid, the resulting precipitate, which has a violet tinge, is composed of a mixture of colloidal iodine and larger, but still minute, ellipsoidal crystals exhibiting a Brownian movement when observed under the microscope.

The colloidal iodine, of the said specification, Serial No. 70,697, in suspension, is brick-red in color. When prepared with great care and under perfect conditions, it is lighter in color and may even seem white in small amounts. Being in a colloidal-like state, this form of iodine is very active. It is quickly soluble in water and thus free iodine is immediately available for most of the uses to which iodine is put, and the possible uses of iodine are thereby extended.

*Example.*—To 100 grams of "semi-solid buttermilk" consisting of 30 grams of solid milk protein matter, is added a total of 30 grams of iodine in one of the forms above specified. After thoroughly stirring this material to insure uniform mixing, it is allowed to stand for about twenty-four hours. At the end of this time the solid matter will be found to have combined with about twenty-three per cent. of the iodine and to have adsorbed the balance, and it will be found settled and concentrated toward the bottom of the container in the form of a thin paste, dark brown in color. After siphoning off the top fluid, this paste is available in its concentrated form. It may be diluted with water for use as a vermicide. The amount of dilution is determined by the percentage of adsorbed iodine and the species of animal to be dosed and the species of worm to be killed. The percentage of adsorbed iodine is determined by quantitative analysis by titration with sodium thiosulphate. The container is then labeled with instructions as to the amount of water to be added for each desired purpose. For instance, if the paste contains 50 grams of adsorbed iodine per 300 c. c. of material, each 3 c. c. should be diluted with water to 10 ounces, for administration in one ounce doses to poultry and 3 ounce doses to sheep. This material appears to be most suitable for administration to poultry for ascaridia in one ounce doses containing about ½ gram of adsorbed iodine. To sheep for stomach worms, it is best administered in three ounce doses containing a total of about 1½ grams of adsorbed iodine.

The process may be modified by treating whey with iodine in the form of the colloidal suspensoid, or the rapidly precipitated iodine, above referred to, using an amount of iodine equal to the dried weight of the protein content of the whey. Part of the iodine combines with the protein material and the resultant composition precipitates out and adsorbs most of the remaining iodine. This product is similar to that obtained by the treatment of the "semi-solid buttermilk" and is handled in a similar manner. Other suitable and plentifully available protein materials, such as egg-albumin, blood albumin, may also be similarly treated.

*Example II.*—To 1000 parts of skim milk, add a suspension of the equivalent of 30 parts of colloidal iodine (made according to the method before described) in 300 parts of water. The mixture is stirred for several hours to produce a uniform product. After standing for 24 hours at room temperature the chemical combination of a part of the iodine with the protein is completed, and all of the rest thereof will have been adsorbed as free iodine to the iodo-casein formed during the chemical reaction. The material is then ready to be standardized for its free iodine content, as described in the previous example, and to be utilized for the purposes stated.

*Example III.*—Thirty pounds of the iodine are added, similarly as in Example II, to a solution of 30 pounds of egg-albumin in 120 gallons of water, under stirring. The adsorption compound is quickly formed but the mixture is allowed to stand for about 24 hours, with occasional stirring, to insure completion of the chemical reaction and the adsorption process. Thereafter the material is standardized for free iodine in the usual manner.

*Example IV.*—To 10 parts of blood-albumin in 450 parts of water, the equivalent of 10 parts iodine, is added, similarly as in the other examples, under stirring. A brown iodine adsorption compound quickly forms. After standing for 24 hours, with occasional stirring, the product is standardized as before.

These examples illustrate types of processes, which may obviously be subjected to variation as to incorporation of the iodine ingredient with a variety of similar proteins.

In the choice of materials it is, however, important to bear in mind the fact that more or less of the elementary iodine is always taken up in chemical combination, and that the iodized protein material, formed incidentally in the process, is itself practically anthelmintically inactive, and merely serves as the carrier or adsorption vehicle of the adsorbed elementary iodine, which is the anthelmintically active ingredient of the finished products. It is, therefore, important, in order to produce an efficient product, with a high elementary iodine content, that the iodine factor should always be used in a sufficient quantity for satisfying both requirements with the given protein used in any case, and to insure a plentiful supply of adsorbed iodine.

It will also aid, in the better understanding of the application of the processes and objects herein described, to state that the processes, in general, consist in treating the selected protein with iodine in solutions whereby relatively large quantities of the iodine are available for acting upon the protein, both to saturate the protein chemically with the iodine and to have further quantities adsorbed thereto. It has been seen that in general the proteins will readily take up in both forms, chemically and by adsorption, a quantity equal to the weight of the protein. The iodine in the form of the suspensoid of the co-pending application Serial No. 70,697, or the rapidly precipitated crystalline form of U. S. Patent 1,535,540, April 28, 1925, meet these requirements admirably. While ordinary crystalline iodine is but sparingly and slowly soluble in water, both of these forms rapidly produce and maintain saturated solutions, for as soon as the iodine in solution is taken up by the protein, either chemically or by adsorption, the water takes up more of these rapidly soluble forms of iodine and thus maintains the aqueous solution at maximum strength. The object is to provide means for constantly presenting the iodine in solution of sufficient active strength and in sufficient total quantity for action upon the protein material, in the manner contemplated and with the object described.

The process may be further carried on by either of the above methods, and the dark brown paste treated with an equal volume of corn syrup (Karo brand), or other similar carbohydrate material, such as gum arabic capable of forming a film on the surface of such a nature that it will permit the escape of the water content but will not permit the escape of the iodine molecule. This mixture is then allowed to evaporate until it reaches the consistency of a thick syrup and does not contain enough free moisture to dissolve a gelatin capsule. It is then loaded into gelatin capsules or globules, for the administration as a vermicide to foxes and dogs.

The process may be still further carried on by desiccating and reducing the material to a powder, after this adding the syrup, and thus concentrated it is available for suspension in either water or oil.

The process may be carried out as above described to the thick syrupy stage of the material and then fortified by the addition of a powder such as charcoal to which an appreciable amount of iodine has been adsorbed, and the resulting mixture may be loaded into gelatin capsules or globules, or rolled into pills which may be "sugar coated" or salol coated, for administration to foxes, dogs or other animals.

Having thus described my invention, what

I claim as new and desire to secure by Letters Patent is:

1. As a new composition of matter, a vermicide comprising iodine adsorbed in elementary form to iodo-casein.

2. As a new composition of matter, a vermicide comprising iodine adsorbed, in elementary form, to iodo-protein.

3. A vermicide, in solid form, comprising a partly desiccated admixture of a milk-protein colloid, iodine adsorbed to said colloid, in elementary form, and corn sugar.

4. A vermicide, in powder form, comprising a desiccated admixture of a milk-protein colloid, iodine adsorbed to the said colloid, in elementary form, and a carbohydrate, substantially as described.

5. Vermicide medicinal composition containing milk-protein, with adsorbed elementary iodine and chemically combined iodine, the adsorbed iodine being in substantial excess over the quantity which is chemically combined.

In witness whereof I have hereunto set my hand.

WALLACE L. CHANDLER.